United States Patent
Schaefer et al.

(10) Patent No.: US 7,293,101 B1
(45) Date of Patent: Nov. 6, 2007

(54) METHOD FOR DETERMINING ACCESS TIME OF REPEATEDLY BROADCAST OBJECTS

(75) Inventors: Ralf Schaefer, Fellbach (DE); Rudolf Bittner, Stuttgart (DE); Markus Zumkeller, Schwaikheim (DE)

(73) Assignee: Sony International (Europe) GmbH, Cologne (DE)

( * ) Notice: Subject to any disclaimer, the term of this patent is extended or adjusted under 35 U.S.C. 154(b) by 0 days.

(21) Appl. No.: 09/293,702

(22) Filed: Apr. 16, 1999

(30) Foreign Application Priority Data

Jul. 16, 1998  (EP) ................................. 98113299

(51) Int. Cl.
*G06F 15/16* (2006.01)

(52) U.S. Cl. .................. 709/232; 709/219; 707/10

(58) Field of Classification Search ........... 709/232, 709/219; 370/349; 707/10
See application file for complete search history.

(56) References Cited

U.S. PATENT DOCUMENTS

| | | | | |
|---|---|---|---|---|
| 5,864,854 A * | 1/1999 | Boyle | ............ | 707/10 |
| 5,878,033 A * | 3/1999 | Mouly | ............ | 370/312 |
| 5,887,263 A * | 3/1999 | Ishii | ............ | 455/452 |
| 5,974,236 A * | 10/1999 | Sherman | ............ | 395/200 |
| 6,067,566 A * | 5/2000 | Moline | ............ | 709/219 |
| 6,137,993 A * | 10/2000 | Almgren et al. | ............ | 455/67.3 |
| 6,157,949 A * | 12/2000 | Cheng et al. | ............ | 709/219 |
| 6,301,243 B1 * | 10/2001 | Copper et al. | ............ | 370/349 |
| 6,345,313 B1 * | 2/2002 | Lindholm | ............ | 709/315 |

FOREIGN PATENT DOCUMENTS

| | | |
|---|---|---|
| EP | 0 406 972 A1 | 1/1991 |
| EP | 0 763 942 A2 | 3/1997 |

* cited by examiner

*Primary Examiner*—Jason Cardone
*Assistant Examiner*—Adnan Mirza
(74) *Attorney, Agent, or Firm*—Frommer Lawrence & Haug LLP; William S. Frommer; Thomas F. Presson

(57) ABSTRACT

Broadcast based information systems like Teletext use a unidirectional communication scheme in order to get access to information. This means that requests for data objects are not transmitted from a client to a server. Instead the receiver part of the client has to listen for the requested object on the broadcast medium and copy it to the local storage when it goes by. The access time from the receiver point of view is defined as the difference between the reception point in time of the object and the point in time when the request was made. Nowadays realized broadcast based information systems are not able to determine precisely when a requested object will be available. The present invention uses a repetition distance which defines an additional parameter which has to be transmitted with each broadcast data object at the transmitter side. The receiver can use this information to determine the precise repetition point in time of a requested object. This information can be used to realize a progress indicator, so that an user can be informed about the time he has to wait for the requested object. Also this information is essential for the realization of certain caching strategies.

17 Claims, 9 Drawing Sheets

Figure 5:
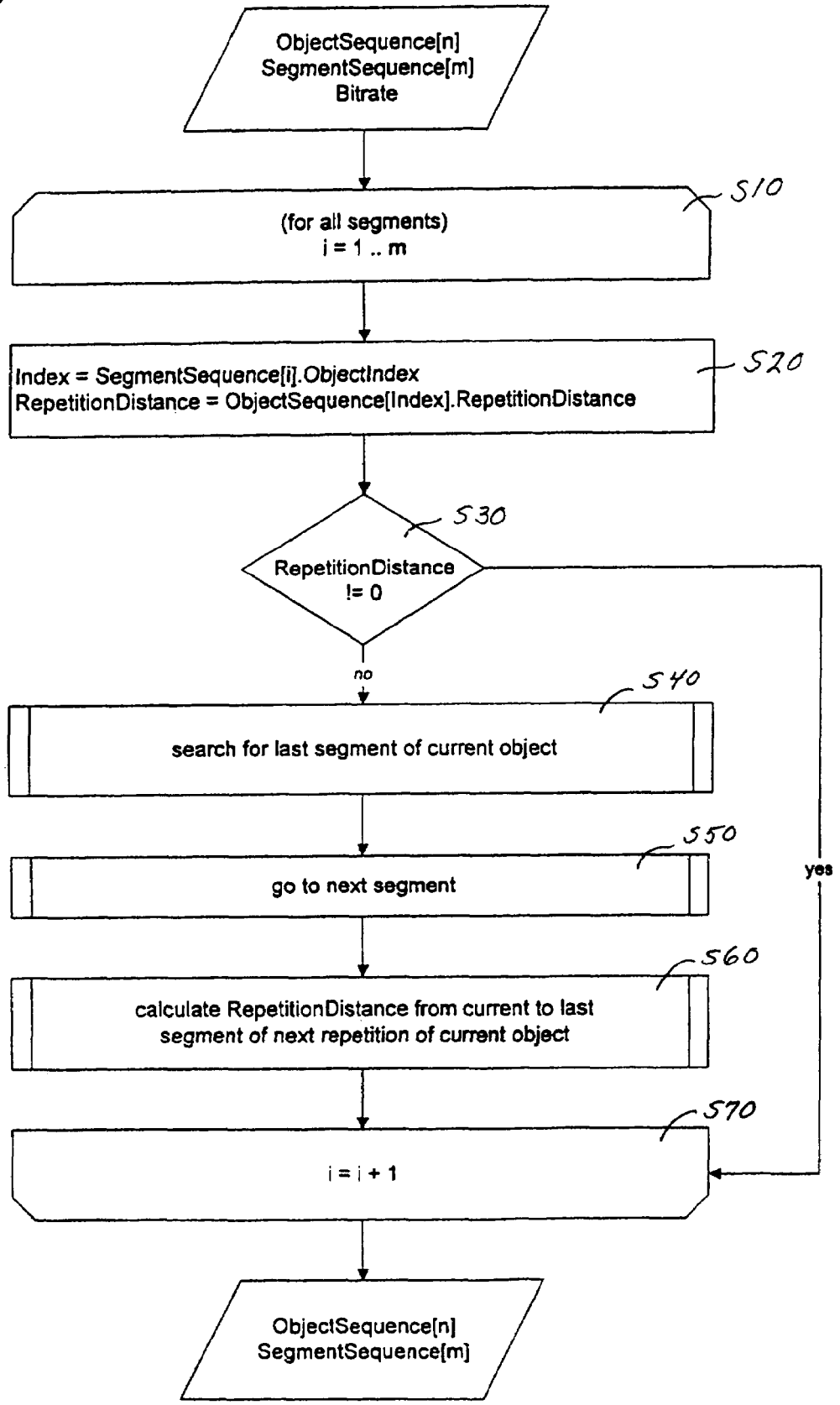

Fig.1
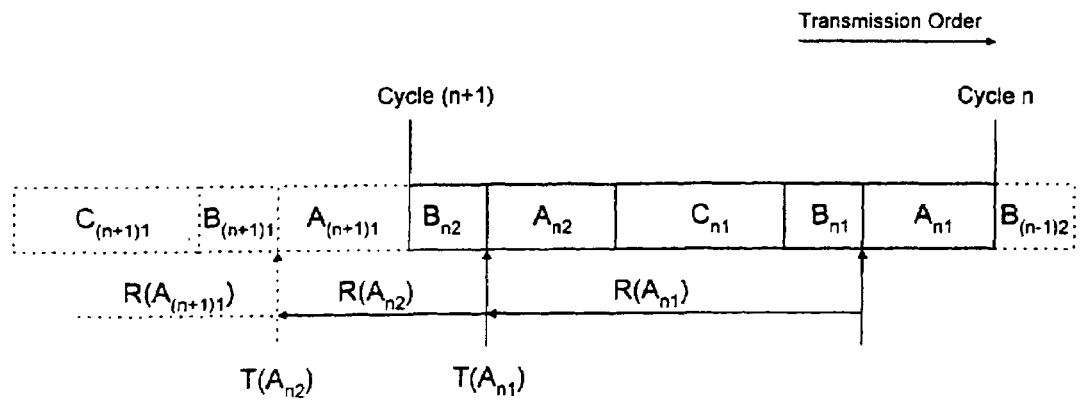
Fig.2
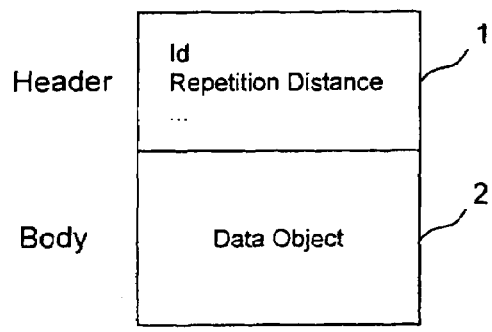
Fig.3
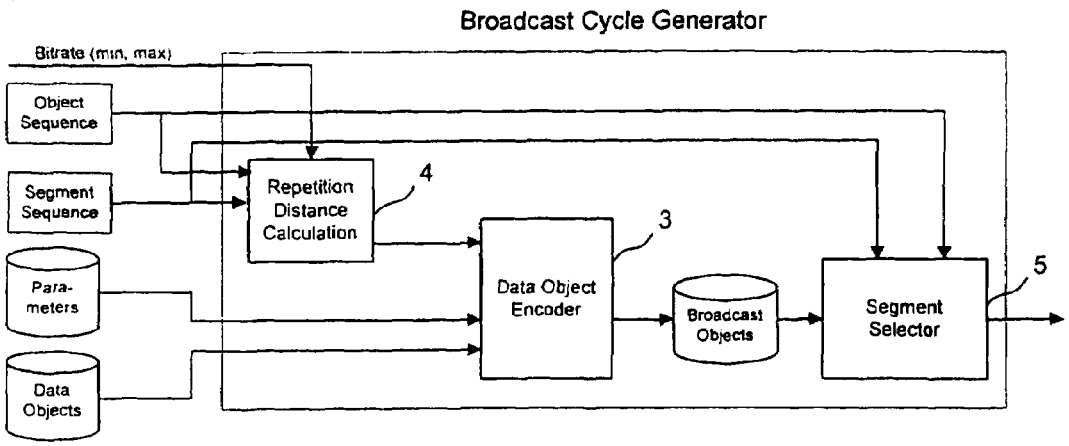
Fig.4
ObjectSequence[1..n] = { Id, RepetitionDistance, ... }
SegmentSequence[1..m] = { SegmentSize, LastSegment, ObjectIndex, ...}

Fig.9
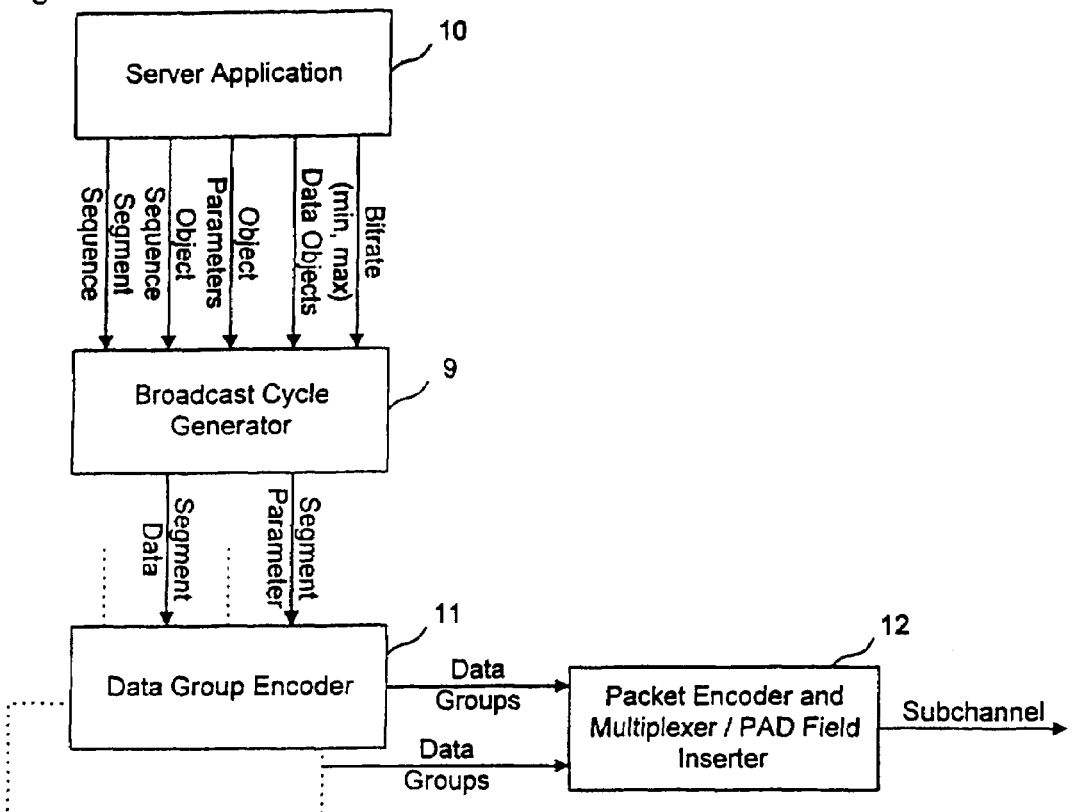
Fig.10
Fig.13
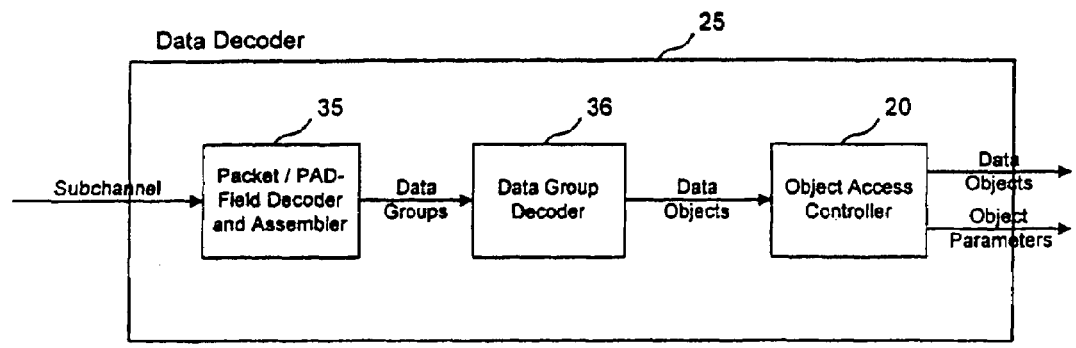
Fig.14
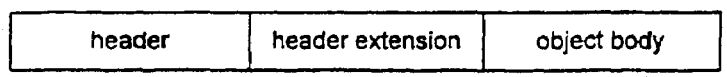

METHOD FOR DETERMINING ACCESS TIME OF REPEATEDLY BROADCAST OBJECTS

The present invention relates to a method for determining access times of repeatedly broadcast objects in a broadcast channel using a unidirectional communication scheme in order to transmit the broadcast objects from a server side to a receiver side.

Information systems that are based on broadcast channels provide means only for the unidirectional communication from a server at the server side to clients at the receiver side. Therefore the clients are not able to send requests for information to the server. Instead the whole database is transmitted as a set of data objects in a repetitive manner in a broadcast cycle from the server to all clients. The repetition pattern can vary to a great extent, e.g. it is possible to transmit each object once per cycle or to repeat certain objects more often than others. The repetition pattern is normally not known at the receiver side. The objects are self-identifiable which means that the client can identify a certain object from the set of all transmitted objects. In case of an object request issued by the client the receiver side has to listen to what is transmitted on the broadcast medium. When the object goes by it has to copy the object to its local storage and to present to the client. In this scenario the access time can be defined as the difference between the point in time when a request is made and the point in time when the requested object is received from the medium. Due to different broadcast frequencies and broadcast cycle positions of objects the access time for a certain object at a certain point in time is unknown. In comparison to an information system based on bidirectional communication the access time can vary to a much greater extent due to the fact that the access time depends on the number of objects which have to share the broadcast channel.

An example of such broadcast based information system is the Teletext system which uses an unidirectional communication scheme in order to get access to information. This means that requests for data objects are not transmitted from the client to the server. Instead the receiver side of the client has to listen for the requested object on the broadcast medium and copy it to its local storage when it goes by. The access time from the receiver point of view is defined as the difference between the reception point in time of the object and the point in time when the request was made. Nowadays realized broadcast based information systems are not able to determine precisely when a requested object will be available.

Therefore, it is an object of the present invention to provide a method for determining access times of repeatedly broadcast objects for realizing a progress indicator which indicates how long it takes to obtain a certain information.

To solve this object the present invention provides a method as specified in claim 1.

Preferred embodiments of the invention are described in the subclaims.

In the method of the present invention, the repetition distance defines an additional parameter which has to be transmitted with each broadcast data object at the transmitter side. The receiver side can use this information to determine the precise repetition point in time of a requested object. This information can be also used to realize the above progress indicator, so that a client can be informed about the time he has to wait for the requested object. Also this information is essential for the realization of certain caching strategies i.e. in the field of caching in broadcast environments.

In order to determine the access times of data objects transmitted in a broadcast channel some additional information, i.e. information on the repetition distance, about the broadcast cycle has to be generated at the server side and transmitted in the broadcast channel to the receiver side. The receiver side obtains the information, calculates an appropriate value and stores it. In this way an application of the repetition distance can query the next transmission point in time of a certain object at any time.

In the method of the present invention, a broadcast object decoder retrieves an unique identifier of an object and the repetition distance and obtains the current time value from a time service, and an absolute value for a reception point in time is calculated from the repetition distance and the current time value and is stored together with the object. Further a data object requester allows to request certain objects by an object identifier and allows to request the next reception point in time of an object. The data object requester can use the repetition distance as repetition time information for managing a cache. As an example, the method of the present invention is used in a progress indicator.

Figure 6:
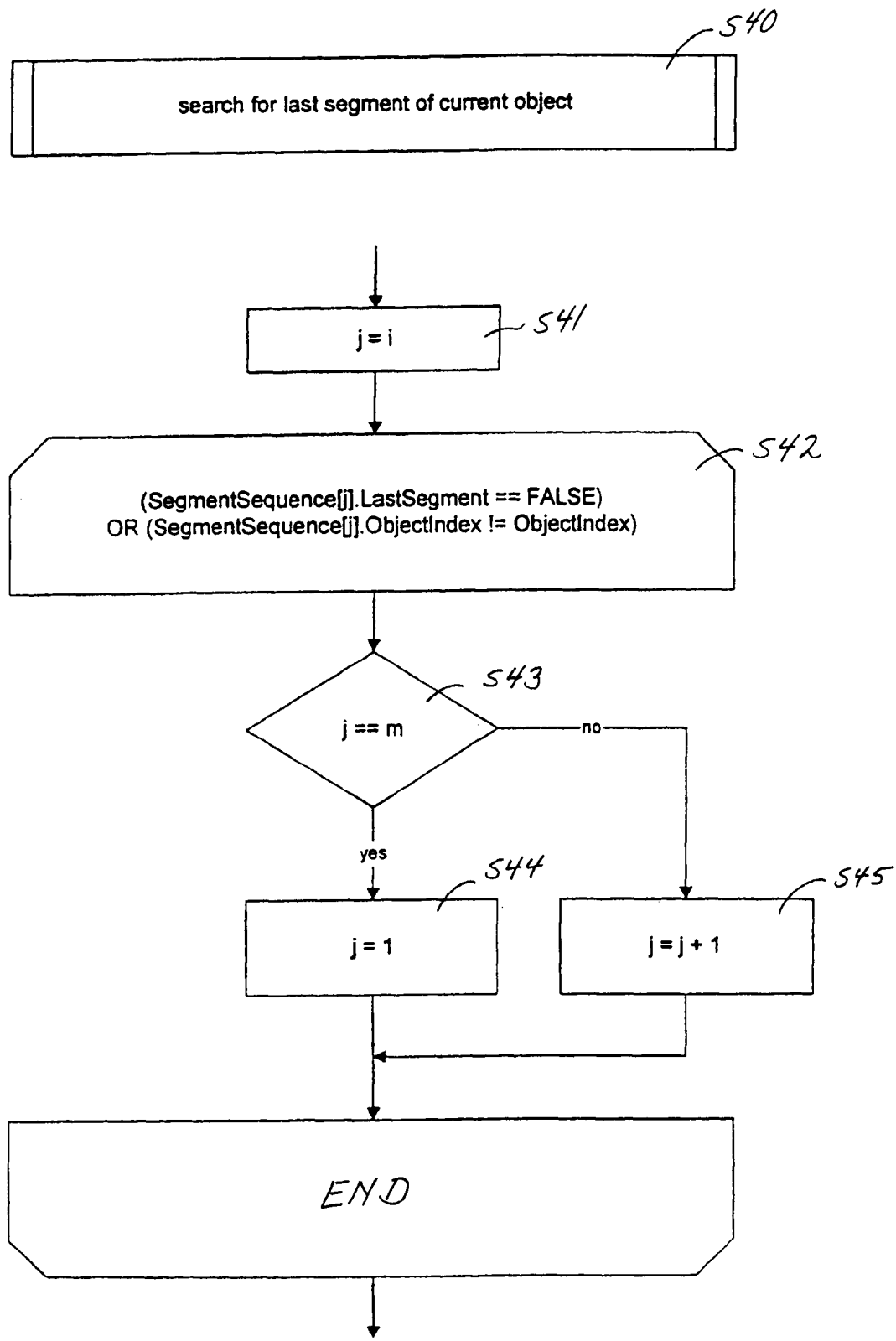
Figure 7:
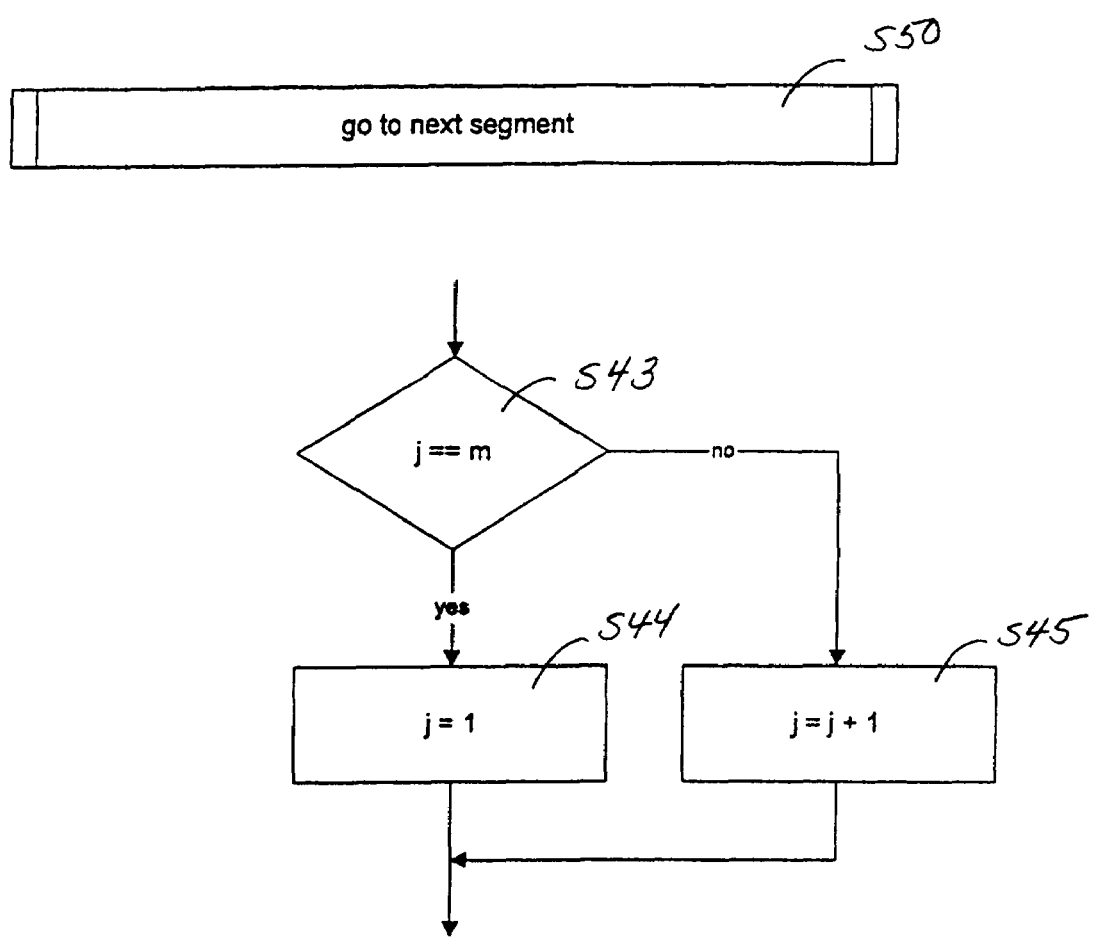
Figure 8:
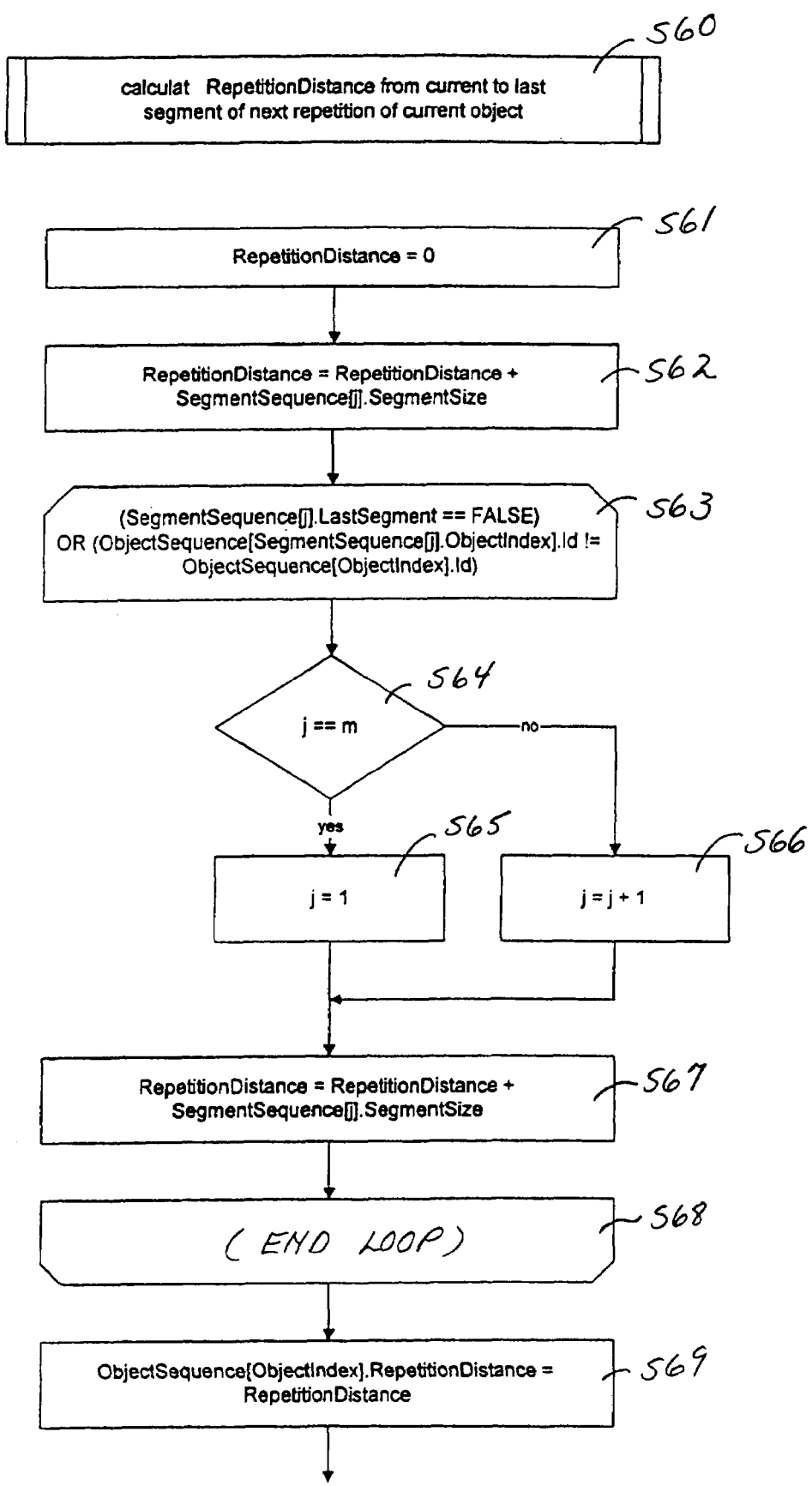
Figure 11:
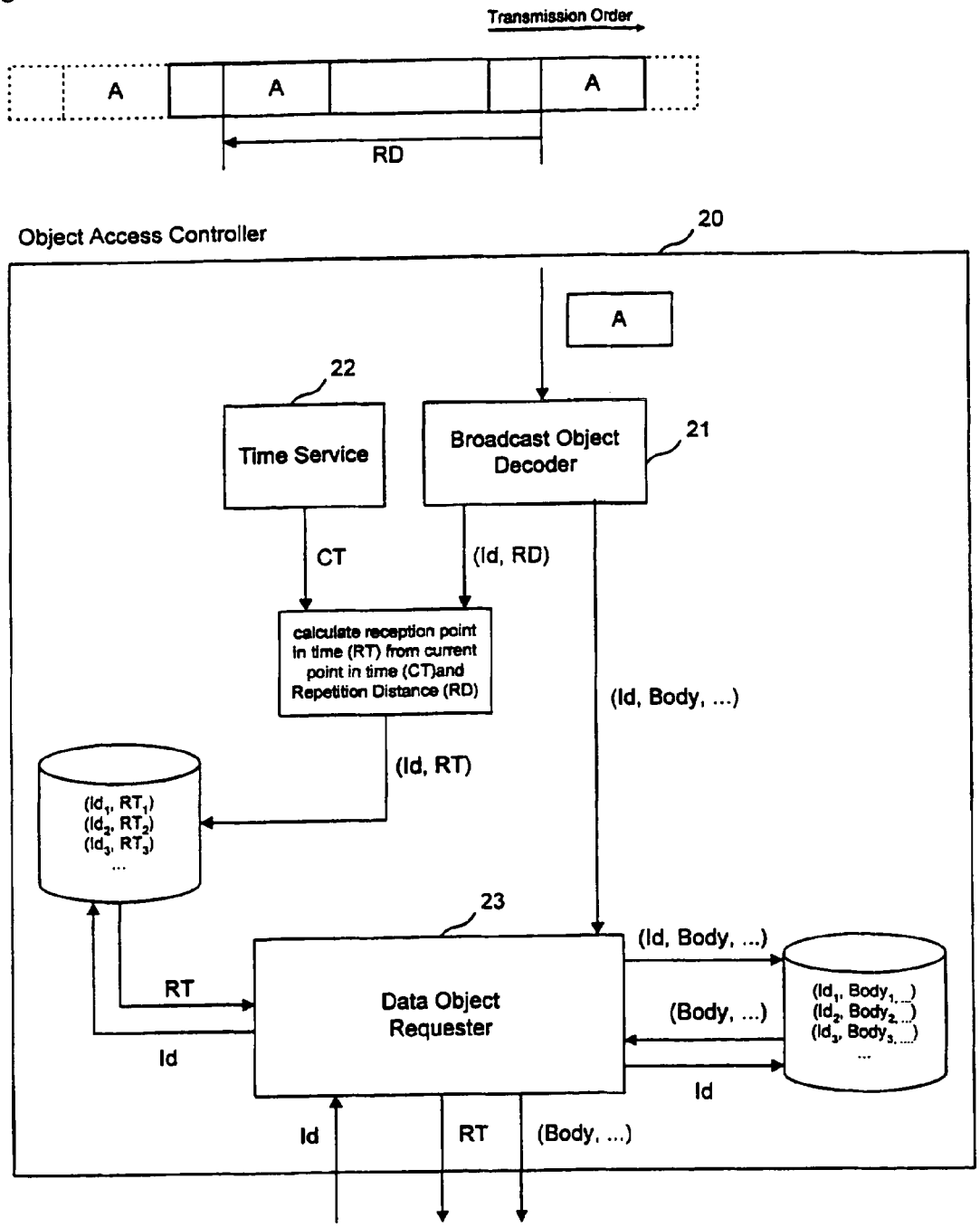
Figure 12:
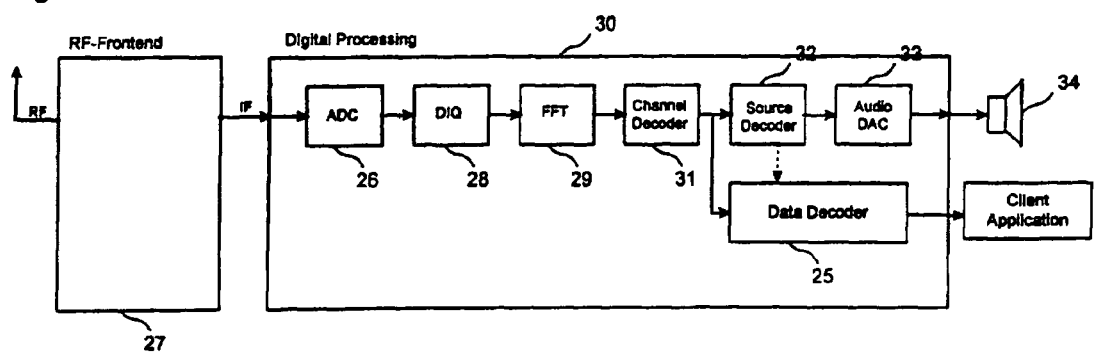
Figure 15:
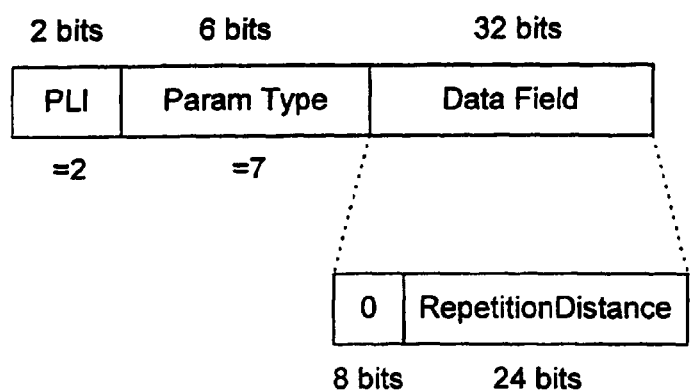
Figure 16:
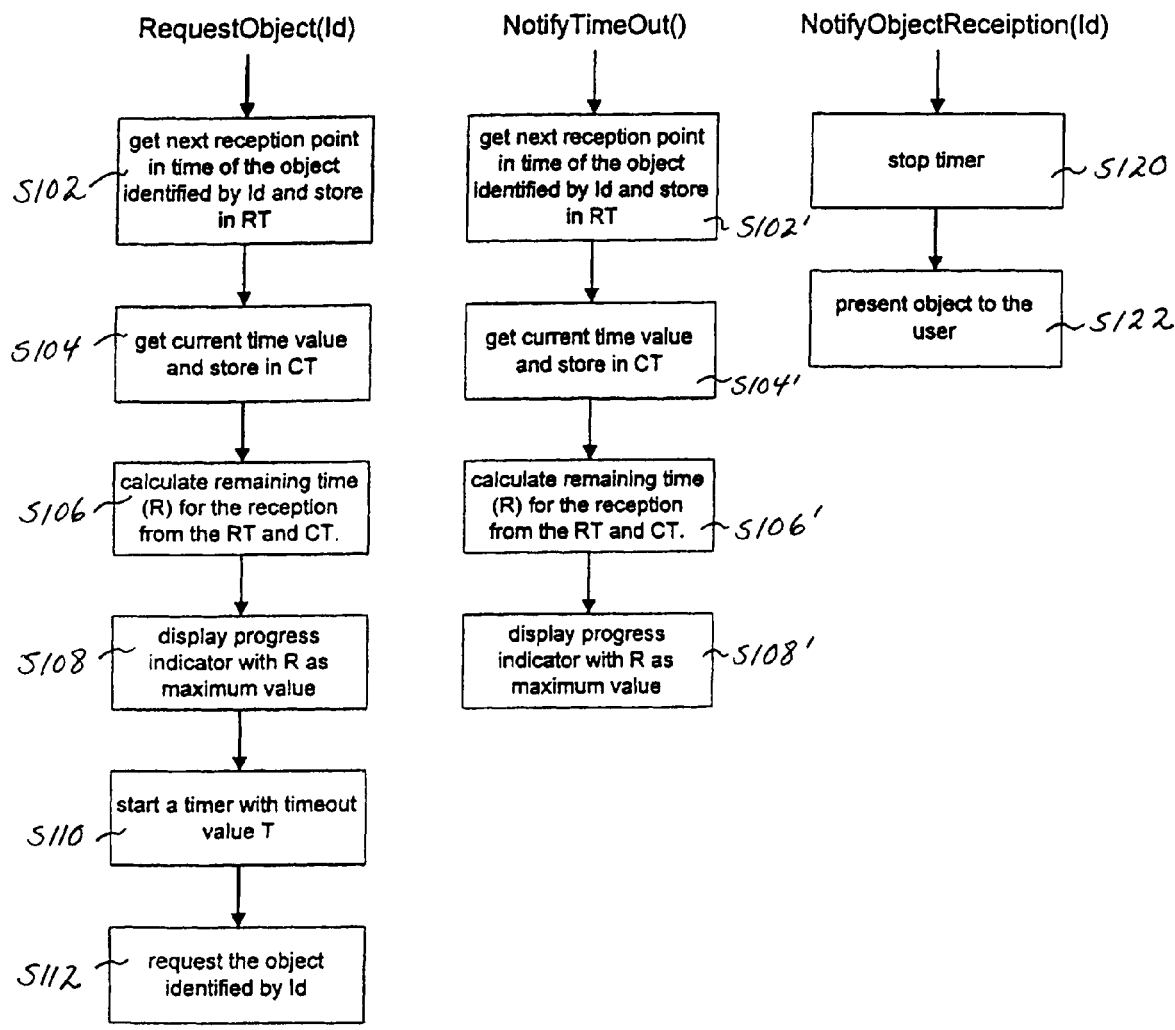

Further objects, details and advantages of the invention will be apparent from the following detailed description in conjunction with the drawings, in which:

FIGS. 1 and 2 are diagrams useful for explaining the meaning of the repetition distance, FIG. 3 shows a broadcast cycle generator, FIG. 4 gives a description of a broadcast cycle, FIG. 5 is a flowchart explaining the calculation of the repetition distance (main part), FIG. 6 is a flowchart explaining the calculation of the repetition distance (refinement: search for the last segment of current object), FIG. 7 is a flowchart explaining the calculation of the repetition distance (refinement: go to the next segment), FIG. 8 is a flowchart explaining the calculation of the repetition distance (refinement: calculate repetition distance from current to last segment of next repetition of current object), FIG. 9 is a chart explaining the calculation of the repetition distance (repetition distance as a time based value), FIG. 10 shows a block diagram of the broadcast server architecture (for a DAB system), FIG. 11 shows the structure of an object access controller in a receiver, FIG. 12 shows an overview of a receiver architecture in a DAB system, FIG. 13 shows the receiver architecture in a DAB-system (Data decoder), FIG. 14 shows a basic object structure in the DAB system, FIG. 15 shows how the repetition distance is coded in the DAB system, and FIG. 16 a flowchart explaining the realization of a progress indicator.

In the following, first it is described how the repetition distance can be defined, how it is generated at the server side and how it is used at the receiver side.

FIG. 1 shows an example of a simple broadcast cycle which consists of three data objects A, B and C. The transmission order is from left to right which means that objects to the right will be transmitted before objects to the left. The objects of a broadcast cycle may have different sizes and may be transmitted with different repetition rates.

In this example objects A and B are transmitted twice and object C once per cycle. The objects A, B and C are marked with an index, e.g. $A_{ij}$. The first index i indicates the broadcast cycle, the second one j is a counter for repetitive transmissions of the object in the current cycle. For example, $A_{n2}$ means that object A is transmitted the second time in the n-th broadcast cycle.

A parameter called repetition distance R(X) is defined which is transmitted with each object X. It specifies the distance between the completed transmission of the object X and its next repetition, e.g. object $A_{n1}$ has a repetition distance which is represented by $R(A_{n1})$. Although the repetition distance defines the distance between repetitions of objects there is no restriction that the content of objects is not allowed to change or that the size has to remain unchanged. Also the broadcast cycle does not have to be static. The repetition distance just defines the distance between two objects, but the value of the repetition distance can change with each transmitted object.

FIG. 2 illustrates the basic structure of a broadcast object transmitted in a broadcast channel. A broadcast object consists of a header 1 and a body 2. The header 1 provides additional information about the data object which is encoded in the body 2. Examples of header parameters are identifiers Id which uniquely identify a certain object among all objects of the broadcast channel or a parameter which indicates the size of the object. The repetition distance can be transmitted together with the other parameters in the header 1.

The following alternatives can be used for the encoding of the repetition distance:
(a) Number of objects: The repetition distance R(X) of an object X specifies how many objects will be transmitted after the object X until the object X will be transmitted again. This alternative is less accurate than the others (b) and (c) below.
(b) Amount of data: The repetition distance R(X) of an object X specifies how much data will be transmitted after the object X until the object X will be transmitted again. Depending on how accurate the repetition distance has to be several units of measurement can be used, e.g. bit, byte, kbyte or whatever is appropriate.
(c) Time value: The repetition distance R(X) of an object X specifies how long it takes after a transmission or the object X until the object X will be transmitted again. Depending on how accurate the repetition distance has to be several units of measurement can be used, e.g. milliseconds, seconds, minutes or whatever is appropriate.

In environments where it is too difficult or not possible for the broadcaster on the server side to determine the exact repetition distance it is also possible to use an upper bound. This upper bound specifies a maximum value for the repetition distance so that an object will be transmitted completely maybe before the value specified by the repetition distance but latest at the point in time specified by the repetition distance. Each of the above mentioned alternatives can be realized as an exact value or as a maximum value. In case of a maximum value it has to be taken into account that the information which is given by the repetition distance is less accurate.

The term "repetition distance" shall be understood in its broadest sense: It specifies not only distance values ("repetition distance") but also absolute values ("repetition time").

In other words, in order to determine the repetition point in time of objects at the receiver side, it is also possible to use absolute values for the signalisation. This means that another parameter repetition time has to be carried in the object header instead of the above repetition distance. The repetition time of an object A defines when the next repetition of object A takes place.

Again, one of the following alternatives can be used for the encoding of the repetition time:
(a) Number of objects: The repetition time R(X) of an object X specifies the absolute number of objects that have been transmitted until the object X will be transmitted again. This alternative is less accurate than the others.
(b) Amount of data: The repetition time R(X) of an object X specifies the absolute amount of data that has been transmitted until the object X will be transmitted again. Depending on how accurate the repetition time has to be several units of measurement can be used, e.g. bit, byte, kbyte or whatever appropriate.
(c) Time value: The repetition time R(X) of an object X specifies the absolute transmission point in time of the next repetition of the object X. Depending on how accurate the repetition time has to be several units of measurement can be used, e.g. milliseconds, seconds, minutes or whatever appropriate.

In environments where it is too difficult or not possible for the broadcaster on the server side to determine the exact repetition time it is also possible to use an upper bound. As explained above this upper bound specifies a maximum value for the repetition time so that an object will be transmitted completely maybe before the value specified by the repetition time but latest at the point in time specified by the repetition time. Each of the above mentioned alternatives can be realized as an exact value or as a maximum value. In case of a maximum value it has to be taken into account that the information which is given by the repetition time is less accurate.

In the following, the procedure on the server side will be explained in details with reference to the generation of broadcast cycle and repetition distance.

In a broadcast system the task of the server is to transmit all data objects belonging to a data service in a repetitive manner. Different transmission patterns (broadcast cycle) can be applied. It is possible to transmit some objects more often than others (see FIG. 1) and in different orders. Examples of broadcast cycles for three data objects A, B and C are ABC, BAC, AABC, ABAC, ABABAC, and so on.

Additionally data objects can be segmented into smaller units and the segments of different data objects can be interleaved. This allows overlapped transmission or nearly parallel transmission of data objects, which means that the transmission start or end of data objects can be performed nearly at the same point in time.

FIG. 3 shows the operating structure of a broadcast cycle generator including the calculation of the repetition distance. The broadcast cycle generator takes a description of the designed broadcast cycle and the data objects. The description of the broadcast cycle is given as a sequence of segments and a sequence of objects (see FIG. 4). The sequence of objects describes which objects belong to the broadcast cycle and how often each object is included in the cycle. The sequence of segments describes the transmission order of segments of all objects. Additionally a parameter specifying the allocated bitrate for the transmission of data objects is needed if the repetition distance is encoded as a time value.

A data object encoder 3 gets the data object e.g. a HTML file and some additional parameters like an identifier or a version information. The data object is encoded in the body and the parameters in the header as illustrated in FIG. 2. The repetition distance is another parameter of the header. The calculation of the repetition distance is done in the block 4 called Repetition Distance Calculation.

A flowchart for the calculation is shown in the FIGS. 5 to 9. All data objects of the broadcast cycle will be encoded by the data object encoder 3 and stored as broadcast objects for transmission.

A segment selector 5 takes the information about the broadcast cycle and selects the segments from the stored broadcast objects. The selected segments are passed on to a segment transmitter.

In the following the calculation of the repetition distance is described (FIG. 5 to FIG. 8). The description of the broadcast cycle is given by the parameter object sequence and segment sequence as shown in FIG. 4. The parameter object sequence contains an entry for each data object and all its repetitions in the broadcast cycle. This entry stores at least the Id of the object and the repetition distance. The repetition distance must be set zero. The parameter segment sequence contains an entry for each segment to be transmitted. Each entry stores the size of the segment, the index or the object it belongs to and a flag which determines if it is the last segment of this object. The sequence of segments (1 . . . m) also determines the transmission order of segments. In case of encoding of the repetition distance as a time-based value also the bitrate allocated for the broadcast cycle is necessary for the calculation.

The calculation of the repetition distance (FIG. 5) starts with a loop iterating over all segments of the broadcast cycle in transmission order (1 . . . m) (step S10). The parameter i references the current segment. The first block inside the loop determines the object the current segment is belonging to and stores its index in the parameter index (step S20). Index references the object in the parameter object sequence. After that the repetition distance of this object is stored in a parameter "repetition distance".

In the next block (step S30) the repetition distance is tested if it is unequal to zero, which means that the repetition distance already has been calculated in an iteration step before. In this case the next segment can be processed.

If the repetition distance is equal to zero the repetition distance of the current object is calculated in three steps. First, a search for the last segment of the current object (step S40, detailed in FIG. 6) is performed. Second, the next segment (step S50, detailed in FIG. 7) is achieved and third the repetition distance is calculated from this segment to the last segment of the next repetition of the current object (step S60, detailed in FIG. 8). The parameter i is then incremented in step S70.

The first step S40 is done as follows (FIG. 6). A start is performed with the currently processed segment of the main loop which is referenced by i and its value is stored in paragraph j (step S41). In the next block (step S42) a loop condition is tested. In case that the segment referenced by j is not a last segment or the segment is belonging to another object as referenced by parameter "ObjectIndex" the last segment of the current object is not found and the next segment must be tested. Therefore the segment index j is increased by one (step S45) in case that the last segment of the cycle has not been reached (as determined in step S43). Otherwise the procedure goes back to the first segment of the sequence, which is expressed by setting the parameter j to one (step S44).

In the second step S50 (FIG. 7) the segment position j is set to the segment following the last segment of current object. This is done by increasing j by one in case that the last segment of the cycle has not been reached and otherwise the procedure turns back to the first segment (steps S43-S45).

The third step S60 (FIG. 8) calculates the repetition distance of the current object by addition of the segment sizes of all segments from the segment referenced by j and the last segment of the next repetition of the current object. In the first block the parameter "repetition distance" is set to zero (step S61). After that the segment size of the segment referenced by j is added to the repetition distance parameter (step S62). In the third block (step S63) it is looped as long as the segment that is referenced by j is not a last segment or the segment is belonging to an object with another Id. The latter case means that the segment is not belonging to the same object or not to a repetition of this object. If the loop is entered the segment index is increased by one (step S66) in case that the last segment of the cycle has not been reached (as determined in step S64). Otherwise the procedure goes back to the first segment of the sequence, which is expressed by setting the parameter j to one (step S65). Then the segment size of the segment referenced by j is added to the repetition distance (step S67) and the iteration step is finished (block S68).

In the case of encoding the repetition distance as a value reflecting the amount of data transmitted between two repetitions of an object the calculation has been finished at this point and the value is stored in the "repetition distance" parameter of the currently processed object (step S69). In the case of encoding the repetition distance as a time-based value the parameter must be divided by the bitrate allocated for the broadcast cycle and afterwards the value is stored in the "repetition distance" parameter of the currently processed object. The last block of FIG. 8 must be exchanged by the block S69' shown in FIG. 9 for the latter case.

In the following it is described as a general example how the broadcast cycle generator 9 including the calculation of the repetition distance can be realized in a DAB system (FIG. 10).

A server application block 10 delivers a data service consisting of several data objects (parameter: data objects). It is also responsible for the assignment of additional parameters (parameter: object parameters) to each object in order to transmit the data service via a broadcast channel. This includes unique Ids for the objects, version information, object sizes and so on. Additionally the server application block 10 has to design the broadcast cycle. This is specified by the parameters "object sequence" and "segment sequence". If the encoding of the repetition distance value shall be done with a time value it is also necessary to specify the bitrate which is available to the data service. If it is not possible to do this exactly a minimum or maximum value can be used. In case of a repetition distance encoding according to the amount of data or number of objects as described above a bitrate value is not required.

With these parameters the broadcast cycle generator 9 calculates the repetition distance of each data object and selects segments for the transmission. The selected segments are delivered together with some additional parameters concerning the segmentation, e.g. segment number, segment size, and so on to a data group encoder 11. The data group encoder 11 encodes segment data and segment parameter in a so-called data group.

The data groups are delivered to a packet encoder and multiplexer/Pad field inserter (PAD=Programme Associated Data) 12. It may be gets data groups from more than one data group encoder 11, divides the data groups in smaller units due to transmission packet limitations and multiplexes all the packets in a sub-channel. A subchannel is the basic frame structure of the DAB system.

In the following, the procedure on the receiver side will be explained in details with reference to the handling of the repetition distance.

In the following it is explained what at the receiver side has to be done in order to use the repetition distance. FIG. 11 shows a block diagram with the operating of the object access controller 20 in a receiver in case a time value is used for the encoding of the repetition distance. Each object received from the broadcast channel is given to a block called broadcast object decoder 21. This is done after a resegmentation and de-interleaving objects. The broadcast object decoder 21 knows about the structure of an object and has access to the header information and to the data object stored in the body.

First, the broadcast object decoder 21 retrieves the unique identifier of the object Id and the repetition distance RD. In the next step a current time value CT is obtained from a block 22 which is called time service. The time service can be based on the system time of the receiver if available or on any other permanent available time provider, e.g. delivered as an additional service in the broadcast channel. The next reception point in time RT of the object is calculated from the current time value CT and the repetition distance RD. Then the reception point in time RT is stored with the object identifier Id for all received objects.

Second, the broadcast object decoder 21 delivers the data object encoded in the body together with additional information from the object header, e.g. the identifier Id to a block 23 called data object requester. This block 23 allows users of the block to request certain objects from the broadcast channel by the object identifier Id. If an object is requested it has to be delivered to the requester block 23 as soon as possible. Independent from the fact if there is a request or not, the received object data can be stored in a local memory in order to provide a feater access in case of a future request.

The data object requester block 23 is connected to a storage which contains the next reception point in times for all objects once received. A user of the data object requester block 23 can query the next point in time of an object identified by its Id.

FIG. 12 shows the basic structure of a DAB receiver including the data service decoding part. Basically, the DAB receiver consists of a RF-frontend 27 and a digital processing unit 30 including the data decoder 25. The RF-frontend 27 converts the received RF signal into an appropriate intermediate frequency (IF) signal. After an analog-digital conversion in a unit 26, the generation or the base band signal (in a unit 28) and the OFDM demodulation in a FFT unit 29 a channel decoder 31 provides a subchannel which is the basic frame structure of the DAB system. In case of a subchannel containing an audio stream the sub-channel is decoded by an audio source decoder 32 and converted to an analog audio signal (block 33) which is fed to a loudspeaker 34. In case of a subchannel containing encoded data objects, the subchannel data is fed to the data decoder 25 which is illustrated in FIG. 13. In case of a subchannel containing audio and data as PAD fields (PAD=Programme Associated Data) together it is possible either to strip off the PAD fields by the source decoder 32 and fed them to the data decoder 25 or to fed audio and data to the data decoder 25. In the latter case the data decoder 25 has to strip off the PAD fields. The output of the data decoder 25 is used by a client application which presents the objects to the user. The data decoder 25 gets the subchannel data and decodes packets in the first step. One or more packets build a data group. Also packets of different data groups might be transmitted in an interleaved manner. A packet decoder 35 provides complete data groups to a data group decoder 36. The data group decoder 36 extracts the segments from the data groups and reassembles broadcast objects. The broadcast objects are given to the object access controller 20. The operating of the object access controller 20 is described in FIG. 11.

The outputs of the object access controller 20 are the data objects itself and additional object parameters necessary for the processing by a client application.

In the following, the realization of the repetition distance in the DAB system is explained in details.

In the DAB system data objects are transmitted in a basic structure which is illustrated in FIG. 14. The header contains elementary information for the handling in the receiver. The header extension contains additional information which is necessary for the handling of some types of data objects.

The information in the header extension is organized as a parameter list with different parameter types for different requirements concerning the length of the parameter. The coding for the repetition distance can be realized as illustrated in FIG. 15. A PLI field (PLI=Parameter Length Indicator) is encoded with two bits and the decimal value 2 signals that a 32 bit data field is following. A field Param (Parameter) Type indicates which parameter is encoded in the data field. The decimal value 7 is used for the repetition distance. The value of the repetition distance itself is encoded as a 24 bit value in the data field. The remaining 8 bit are set to 0. The value indicates the repetition distance as a maximum time value until the next repetition of the object will be completed. The resolution of the time value is $\frac{1}{10}$ second.

In FIG. 16 a flowchart is illustrated which shows how a progress indicator can be realized based on the knowledge of the repetition distance. The described case is valid for a receiver which has not additional storage in which received objects can be stored for future requests.

The action is initiated by a request for an object identified by its Id (Request Object (Id)). In the first step S102 the next reception point in time (RT) is retrieved and stored. After that the current time value is obtained and stored in CT (step S104). The remaining time R is calculated in step S106 as the difference of RT and CT. The result is the maximum value for a progress indicator and can be presented to the user in step S108. In order to indicate the progress of reception the progress indicator has to be updated in certain intervals. Therefore a timer can be started (step S110) with an appropriate time out value, e.g. one second. After that a request for the object is made (step S112) at the object access block 20.

The next action is initiated by the time outs of the timer 22 (Notify Time Out). With each time out the remaining time for the reception R is calculated from the reception point in time (RT) and the current time value (CT). The time value is going on and the remaining time R becomes smaller. After that the progress indicator is updated with the new value. (Steps S102' to S108'.)

It should be noted that "time out" will be initiated several times before the reception of the object is indicated (notify object reception). Then the timer has to be stopped (step S120) in order to stop updating the progress indicator. After that the object is presented to the user (step S122).

In the following caching strategies are explained as an application of the repetition distance.

Caching is often used in order to improve the access time of data objects. The idea behind is to store copies of data objects in a local memory which is faster accessible than the medium where the objects are obtained from. In order to determine which objects to store usually a heuristic is used which estimates the access probabilities of the user. The access time of objects from the medium is usually not used in caching strategies, because in bidirectional communication environments exist only slight differences in the access times of different objects. In broadcast environments all objects share the same broadcast channel. The access times grows with the number of objects which use the channel. Also some objects are transmitted more often than others. This means that the access times of objects can vary to a great extent.

In broadcast environments a caching strategy has to consider the access probabilities of the user and the access times of the objects. The access time of objects can be determined by the repetition distance. One strategy is to store always those objects in the cache which have the largest access times. Another more sophisticated strategy is to store always those objects in the cache which have the largest access times and which belong to a set of objects with access probabilities that are greater than a certain minimum value.

As time goes by the repetition distance of the objects changes and objects in the cache are exchanged.

Broadcast systems today do not allow to determine the access time of objects transmitted in a broadcast channel. The repetition distance uses an additional parameter in the header of a broadcast object in order to inform about the next repetition of this object. In combination with the proper operating in a receiver it is possible to determine the access times of all objects once received before. The repetition distance can be realized with several units of measurement.

Two applications for the repetition distance are a progress indicator and storage management for the improvement of access times.

The invention claimed is:

1. A method for determining access times of a plurality of segments of a plurality of broadcast objects in a broadcast channel using a unidirectional communication scheme in order to transmit the plurality of broadcast objects from a server side to a receiver side, each of the plurality of said segments of said plurality of broadcast objects are permitted to (i) have a different size, (ii) be segmented into smaller units in order to allow overlapped transmission or parallel transmission, (iii) be transmitted in a different repetitive pattern, and (iv) be transmitted in a broadcast cycle in different orders, said method characterized in that each segment of a broadcast object of a current broadcast cycle includes a header defining a repetition distance which is the distance between a completed transmission of the current segment of the broadcast object and the next transmission of a next segment of the broadcast object, and therefore a next reception point in time of said next segment of said broadcast object is calculated from a current time value and said repetition distance;

wherein said repetition distance is calculated using an iterative loop over all of said plurality of segments of the broadcast cycle in transmission order.

2. The method according to claim 1, characterized in that said repetition distance specifies how many of the plurality of broadcast objects will be transmitted after a specific broadcast object until this specific broadcast object will be transmitted again.

3. The method according to claim 1, characterized in that said repetition distance specifies how much data will be transmitted after a specific broadcast object until this specific broadcast object will be transmitted again.

4. The method according to claim 1, characterized in that said repetition distance specifies how much time it will take after a specific broadcast object is broadcast until this specific broadcast object will be transmitted again.

5. The method according to claim 2, characterized by an upper bound which specifies a maximum value for the repetition distance.

6. The method according to claim 2, characterized in that the repetition distance specifies an absolute value in the form of a repetition time.

7. The method according to claim 1, characterized in that on the server side a broadcast cycle generator describes a broadcast cycle as a sequence of segments and a sequence of objects, the sequence of objects describing which objects belong to the broadcast cycle and how often each object is included in the broadcast cycle, and the sequence of segments describing the transmission order of segments of all objects.

8. The method according to claim 7, characterized in that a parameter specifying an allocated bitrate for the transmission of objects is added if the repetition distance is encoded as a time value.

9. The method according to claim 7, characterized in that in a DAB system the broadcast cycle generator receives object parameters from a server application block, calculates the repetition distance of each object and selects segments for the transmission.

10. The method according to claim 1, characterized in that a broadcast object decoder retrieves a unique identifier of an object and the repetition distance and obtains the current time value from a time service, and an absolute value for a reception point in time is calculated from the repetition distance and the current time value and is stored together with the object.

11. The method according to claim 10, characterized in that a data object requester allows to request certain objects by an object identifier and allows to request the next reception point in time of an object.

12. The method according to claim 11, characterized in that the data object requester can use the repetition distance as repetition time information for managing a cache.

13. The method according to claim 1, characterized in that the method is used in a progress indicator.

14. A method for transmitting a plurality of segments of a plurality of broadcast objects from a server side to a receiver side in a broadcast channel using a unidirectional communication scheme wherein each of the plurality of said segments of said plurality of broadcast objects are permitted to (i) have a different size, (ii) be segmented into smaller units in order to allow overlapped transmission or parallel transmission, (iii) be transmitted in a different repetitive pattern, and (iv) be transmitted in a broadcast cycle in different orders, said method comprising the steps of:

attaching a header to a broadcast object of a current broadcast cycle, said header defining a repetition distance which is a distance between the point at which the transmission of the current segment of the broadcast object and the next transmission of a next segment of the broadcast object will be completed;

transmitting the broadcast object along with its header in the broadcast channel from the server side to the receiver side; and calculating said repetition distance using an iterative loop over all of said plurality of segments of the broadcast cycle in transmission order.

15. The method according to claim 14, characterized in that said repetition distance specifies how many of the plurality of broadcast objects will be transmitted after a specific broadcast object until the specific broadcast object will be transmitted again.

16. The method according to claim 14, characterized in that said repetition distance specifies how much data will be transmitted after a specific broadcast object until the specific broadcast object will be transmitted again.

17. The method according to claim 14, characterized in that said repetition distance specifies how much time will elapse after a specific broadcast object is broadcast until this specific broadcast object will be transmitted again.

* * * * *